(12) United States Patent
Arányi et al.

(10) Patent No.: US 12,473,012 B2
(45) Date of Patent: Nov. 18, 2025

(54) STEER-BY-WIRE STEERING SYSTEM OF A ROAD VEHICLE WITH EXTERNAL STEERING WHEEL ANGLE SENSOR

(71) Applicants: thyssenkrupp Presta AG, Eschen (LI); Honda Motor Co., Ltd., Tokyo (JP)

(72) Inventors: Miklós Arányi, Rebstein (CH); Péter Kakas, Budapest (HU); Takashi Kuribayashi, Wako (JP); Yosuke Ojima, Wako (JP); Imre Szepessy, Mauren (LI)

(73) Assignees: THYSSENKRUPP PRESTA AH, Eschen (LI); HONDA MOTOR CO., LTD., Tokyo (JP)

( * ) Notice: Subject to any disclaimer, the term of this patent is extended or adjusted under 35 U.S.C. 154(b) by 65 days.

(21) Appl. No.: 18/612,508

(22) Filed: Mar. 21, 2024

(65) Prior Publication Data
US 2024/0227915 A1    Jul. 11, 2024

Related U.S. Application Data

(63) Continuation of application No. PCT/EP2021/076011, filed on Sep. 22, 2021.

(51) Int. Cl.
*B62D 5/00*    (2006.01)
*B62D 15/02*    (2006.01)

(52) U.S. Cl.
CPC ............ *B62D 5/006* (2013.01); *B62D 15/022* (2013.01)

(58) Field of Classification Search
CPC ................................ B62D 5/001; B62D 5/006
See application file for complete search history.

(56) References Cited

U.S. PATENT DOCUMENTS

| 2019/0009813 | A1* | 1/2019 | Siskoy | B62D 5/0484 |
| 2019/0135336 | A1* | 5/2019 | Jeong | B62D 5/0475 |
| 2020/0070872 | A1* | 3/2020 | Ushiro | B62D 5/04 |
| 2020/0406954 | A1 | 12/2020 | Szepessy et al. | |
| 2021/0253157 | A1 | 8/2021 | Hamori et al. | |
| 2022/0001916 | A1* | 1/2022 | Kimura | B62D 5/003 |

FOREIGN PATENT DOCUMENTS

| DE | 100 53 335 A1 | 5/2002 |
| WO | 2020/095752 A1 | 5/2020 |

OTHER PUBLICATIONS

Official Communication issued in International Patent Application No. PCT/EP2021/076011, mailed on Jun. 15, 2022.

* cited by examiner

Primary Examiner — Long T Tran
(74) Attorney, Agent, or Firm — Keating & Bennett, LLP

(57) ABSTRACT

A steer-by-wire steering system for a road vehicle includes a road wheel actuator to act on steerable wheels and electronically controlled as a function of a driver's steering request, a feedback actuator to transmit reactions of a road to a steering wheel, and a single steering wheel angle sensor to measure a steering wheel angle. The steering wheel angle sensor is an external sensor able to communicate on a second vehicle communication channel or via a private communication with the road wheel actuator. The steer-by-wire steering system also includes an external road wheel actuator position sensor to measure a position of the road wheel actuator and to communicate on the second vehicle communication channel or via the private communication with the road wheel actuator.

6 Claims, 2 Drawing Sheets

STEER-BY-WIRE STEERING SYSTEM OF A ROAD VEHICLE WITH EXTERNAL STEERING WHEEL ANGLE SENSOR

CROSS REFERENCE TO RELATED APPLICATIONS

This application claims the benefit of priority to PCT Application No. PCT/EP2021/076011 filed on Sep. 22, 2021. The entire contents of this application is hereby incorporated herein by reference.

BACKGROUND OF THE INVENTION

1. Field of the Invention

The present invention relates to steer-by-wire steering systems of road vehicles.

2. Description of the Related Art

In steer-by-wire steering systems, the position of the steered wheels is not directly coupled to the steering wheel. There is a connection between the steering wheel and the steered wheels via electrical signals. Instead of the mechanical coupling, a steering actuator is used to position the wheels and a feedback actuator is used to simulate the restoring forces on the steering wheel. To meet the availability requirements, the steering system must be designed in such a way that functionality is always guaranteed. Mainly because of the costs involved, a suitable compromise must be found between the degree of fault tolerance and the number of redundant components.

SUMMARY OF THE INVENTION

Example embodiments of the present invention provide steer-by-wire steering systems of road vehicles which are cost-effective and always work reliably in order to meet the availability objectives.

A steer-by-wire steering system for a road vehicle includes a road wheel actuator to act on steerable wheels and electronically controlled as a function of a driver's steering request, a feedback actuator to transmit reactions of the road to a steering wheel, and a steering wheel angle sensor to measure a steering wheel angle, wherein the steering wheel angle sensor is an external sensor capable of communicating on a second vehicle communication channel or via a private communication with the road wheel actuator, the external steering wheel angle sensor is the only steering wheel angle sensor, the steer-by-wire steering system further includes an external road wheel actuator position sensor to measure a position of the road wheel actuator and is capable of communicating on the second vehicle communication channel or via the private communication with the road wheel actuator.

The system uses existing components to ensure redundancy. In general, a vehicle communication channel indicates that other controllers or devices also communicate on a particular communication channel. Such a vehicle communication channel can be an automotive bus system such as CAN, CAN FD, FlexRay, LIN, Ethernet or similar.

Preferably, the road wheel actuator includes a redundant power supply and is connected to a first power supply and a second power supply. The feedback actuator is connected to the first power supply, and the external steering angle sensor and the external road wheel actuator position sensor are connected to the second power supply. The power supply of the sensors is thus independent of the power supply of the feedback actuator.

Nevertheless, for redundancy reasons, the feedback actuator can be additionally connected to the second power supply.

It is possible that the feedback actuator and the road wheel actuator can communicate with each other on at least one private communication channel and on a first vehicle communication channel, which also makes the communication between the two actuators redundant.

In another example embodiment, the feedback actuator and the road wheel actuator can communicate with each other on a redundant communication channel.

To further increase the redundancy, it is possible for the feedback actuator and the road wheel actuator to additionally communicate with each other on the second vehicle communication channel.

It is preferred that the external steering wheel angle sensor measures an absolute steering wheel angle.

The above and other elements, features, steps, characteristics and advantages of the present invention will become more apparent from the following detailed description of the example embodiments with reference to the attached drawings.

BRIEF DESCRIPTION OF THE DRAWINGS

Example embodiments of the present invention will now be described with reference to the drawings.

DETAILED DESCRIPTION OF THE EXAMPLE EMBODIMENTS

Figure 1:
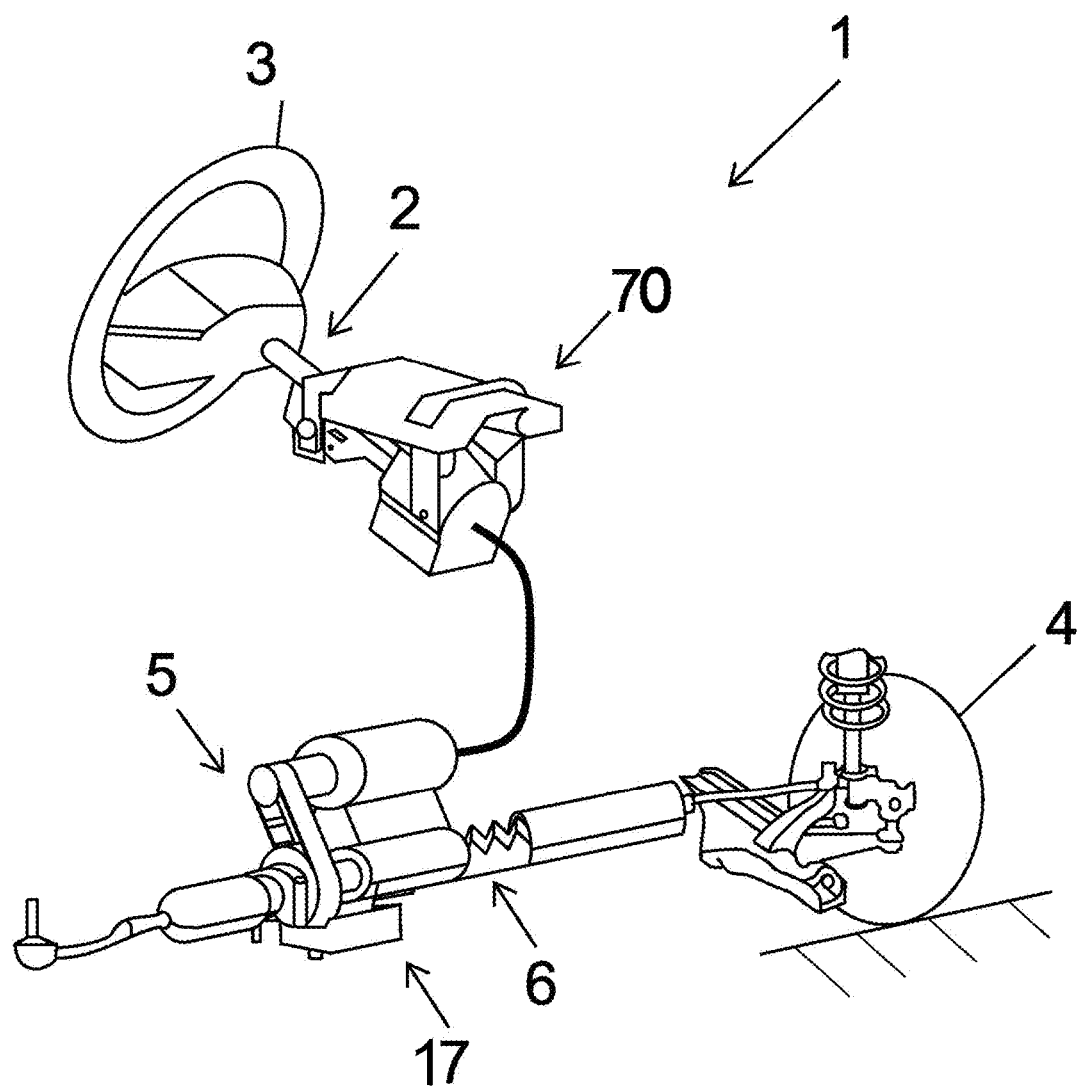
FIG. 1 is a schematic view of a steer-by-wire steering system of a road vehicle.

FIG. 1 is a schematic drawing of a steer-by-wire steering system 1 with a steering shaft 2 connected to a steering wheel 3. There is no mechanical connection between the steering wheel 3 and the road wheels 4. A road wheel actuator 5 operates a gear rack 6 via a recirculating ball gear 17.

When a driver operates the steering wheel 3, the steering shaft 2 is rotated, which is detected by a steering wheel angle sensor, which is not shown in the drawings. A controller is configured or programmed to calculate an operation signal for the road wheel actuator 5 from the signal detected by the steering wheel angle sensor. By operating gear rack 6 with the operation signal, the road wheels 4 are turned. At the same time, forces introduced in the gear rack 6 from the road wheels 4 are recognized by another sensor not shown in the drawings, and a feedback signal is calculated, which is applied to the steering shaft 2 by a steering wheel actuator 70 also called a feedback actuator, so that the operator can recognize the feedback in the steering wheel 3.

Figure 2:
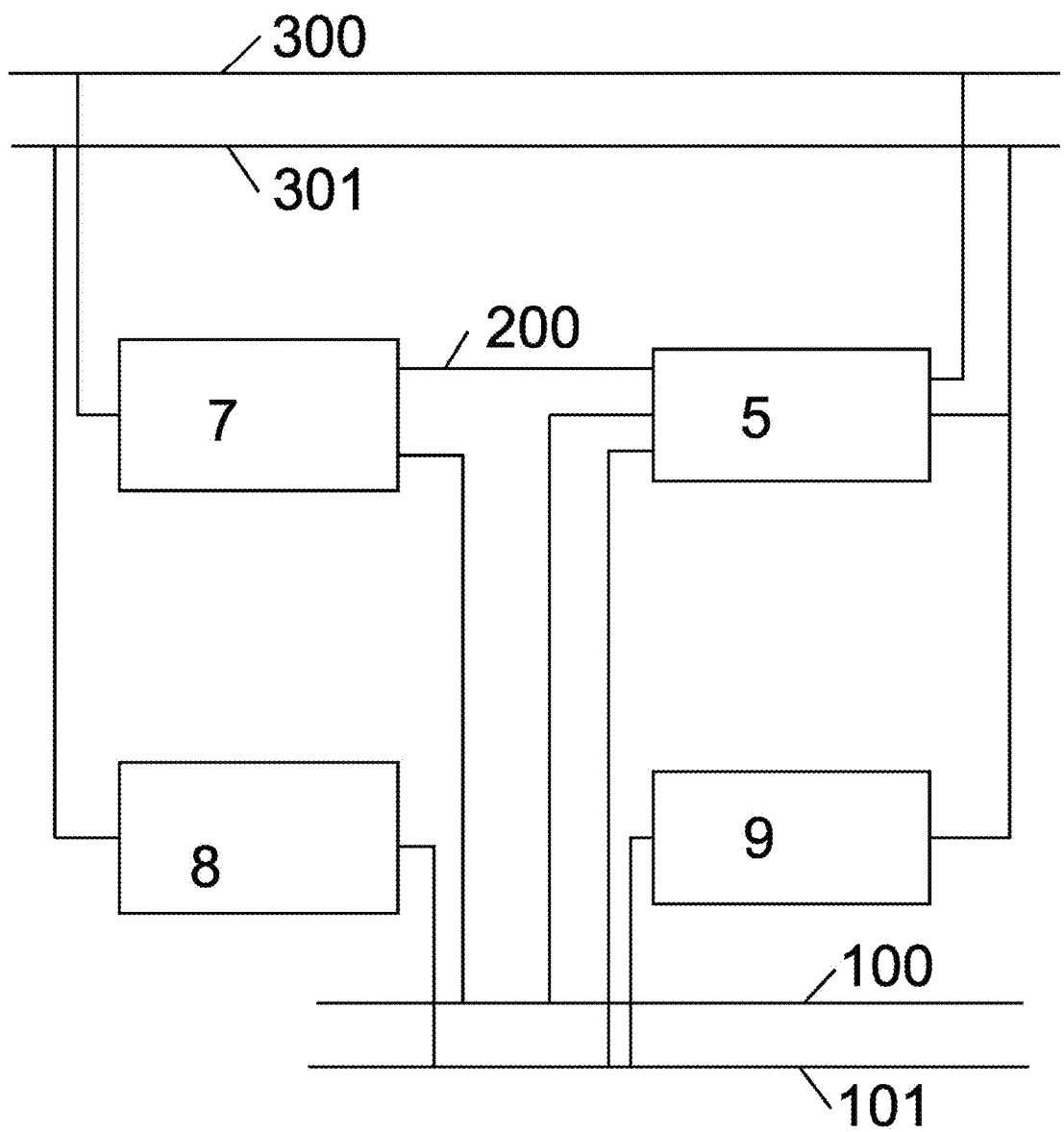
FIG. 2 is a schematic drawing of a block diagram of a steer-by-wire steering system architecture.

FIG. 2 shows a block diagram of an architecture of the steer-by-wire steering system. The feedback actuator 7 and the road wheel actuator 5 communicate with the vehicle and with each other via a common first vehicle communication channel 100. In general, vehicle communication channel indicates that other controllers or devices also communicate on this channel. Such a vehicle communication channel is an automotive bus system such as CAN, CAN FD, FlexRay, LIN, Ethernet or similar. The feedback actuator 7 communicates additionally with the road wheel actuator 5 on a private communication channel 200. In the event of failure of one of the two communication channels (the first vehicle communication channel 100 or the private communication channel 200, for example), the steering system will continue to function correctly, as all required signals are transmitted on both channels 100,200.

A redundant power supply is provided for the road wheel actuator 5. The feedback actuator 7 and the road wheel actuator 5 are each connected to a first power supply 300. The road wheel actuator 5 is also connected to a second power supply 301. In the event of a failure of one of the two power supplies 300, 301 or any other electronic fault (e.g., short circuit, software error, etc.), the other, fault-free power supply 300, 301 guarantees that the road wheel actuator 5 can continue to operate. It is possible that the feedback actuator 7 is also connected to the second power supply 301 for redundancy reasons.

The feedback actuator 7 has no integrated steering wheel angle sensor. An external steering wheel angle sensor (SAS) 8 is provided and powered by the second power supply 301. If the first power supply 300 and thus the feedback actuator 7 fails, the independent steering wheel angle sensor 8 takes over the measurement of the rotational position of the steering shaft and thus the driver's steering request. For this case, the external steering wheel angle sensor 8 can communicate via a second vehicle communication channel 101 with the road wheel actuator 5 in order to be able to pass on the measured angle of rotation to the road wheel actuator 5 to control the steer-by-wire steering.

The road wheel actuator 5 has no integrated position sensor. An external position sensor 9 is provided and is powered by the second power supply 301. The external position sensor 9 is connected via the second vehicle communication channel 101 with the road wheel actuator 5 to define a road wheel actuator position sensor 9.

In case of a hardware failure of the road wheel actuator 5 or other non-availability of the road wheel actuator 5, other systems on the second vehicle communication channel 101 can read and process the steering wheel angle sensor value. This is necessary if, for example, the steering functionality is to be maintained at least partially by breaking or torque vectoring. Since the road wheel actuator position sensor 9 also communicates via the second vehicle communication channel 101, this position value can also be retrieved by other systems in case the road wheel actuator 5 does not work.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A steer-by-wire steering system for a road vehicle, the steer-by-wire steering system comprising:
    a road wheel actuator to act on steerable wheels and electronically controlled as a function of a driver's steering request;
    a feedback actuator to transmit reactions of a road to a steering wheel; and
    a steering wheel angle sensor to measure a steering wheel angle; wherein
    the steering wheel angle sensor is an external sensor capable of communicating on a second vehicle communication channel or via a private communication with the road wheel actuator;
    the external steering wheel angle sensor is the only steering wheel angle sensor;
    the steer-by-wire steering system further comprises an external road wheel actuator position sensor to measure a position of the road wheel actuator and is capable of communicating on the second vehicle communication channel or via the private communication with the road wheel actuator.

2. The steer-by-wire steering system according to claim 1, wherein the road wheel actuator includes a redundant power supply and is connected to a first power supply and a second power supply, the feedback actuator is connected to the first power supply, and the external steering angle sensor and the external road wheel actuator position sensor are connected to the second power supply.

3. The steer-by-wire steering system according to claim 2, wherein the feedback actuator is additionally connected to the second power supply.

4. The steer-by-wire steering system according to claim 1, wherein the feedback actuator and the road wheel actuator are capable of communicating with each other on at least one private communication channel and on a first vehicle communication channel.

5. The steer-by-wire steering system according to claim 3, wherein the feedback actuator and the road wheel actuator are capable of communicating with each other additionally on the second vehicle communication channel.

6. The steer-by-wire steering system according to claim 1, wherein the external steering wheel angle sensor is operable to measure an absolute steering wheel angle.

* * * * *